United States Patent
Jaksztat et al.

(10) Patent No.: US 7,959,850 B2
(45) Date of Patent: *Jun. 14, 2011

(54) METHOD AND DEVICE FOR BLOW MOLDING WORKPIECES BY MEANS OF A BLOWING-STRETCHING MANDREL HAVING SPECIAL AIR DELIVERY PORTS

(75) Inventors: Wolf Jaksztat, Hamburg (DE); Günther Godau, Hamburg (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/570,797

(22) PCT Filed: Aug. 30, 2004

(86) PCT No.: PCT/DE2004/001915
§ 371 (c)(1),
(2), (4) Date: Dec. 8, 2006

(87) PCT Pub. No.: WO2005/023519
PCT Pub. Date: Mar. 17, 2005

(65) Prior Publication Data
US 2007/0114703 A1    May 24, 2007

(30) Foreign Application Priority Data
Sep. 5, 2003    (DE) .................................. 103 40 915

(51) Int. Cl.
B29C 49/12    (2006.01)
(52) U.S. Cl. ......... 264/532; 264/523; 425/529; 425/535

(58) Field of Classification Search ........................ None
See application file for complete search history.

(56) References Cited

U.S. PATENT DOCUMENTS

| 585,264 A | * | 6/1897 | Fahrney | 141/227 |
| 3,305,890 A | | 2/1967 | Senior et al. | |
| 4,005,969 A | * | 2/1977 | Farrell | 425/389 |
| 5,182,122 A | | 1/1993 | Uehara et al. | |

(Continued)

FOREIGN PATENT DOCUMENTS
DE    1 299 406    7/1969
(Continued)

OTHER PUBLICATIONS

Patent Abstracts of Japan, BD. 014, No. 256 (M-0980), Jun. 4, 1990 & JP 02 072929 A (Mitsubishi Plastics Ind. Ltd) Mar. 13, 1990.

(Continued)

*Primary Examiner* — Monica A Huson
(74) *Attorney, Agent, or Firm* — Lucas & Mercanti, LLP; Klaus P. Stoffel

(57) ABSTRACT

Disclosed are a method and a device for blow forming containers (2). A parison (1) is stretched by means of a stretching rod (11) within a blow mold and molded into the container (2) by applying blow pressure following thermal conditioning. Pressurized gas is introduced into the container (2) through the stretching rod (11). The pressurized gas is laterally introduced from a pressure chamber into an interior space of the stretching rod (11). The stretching rod comprises at least one passage opening (53) between a tip (51) facing the blow mold and an end (52) of the stretching rod, which faces away from the blow mold. Said passage opening (53) extends into the interior space of the rod so as to deliver the pressurized gas.

17 Claims, 10 Drawing Sheets

U.S. PATENT DOCUMENTS

| | | |
|---|---|---|
| 6,461,547 B1 | 10/2002 | Oas |
| 6,733,716 B2 * | 5/2004 | Belcher .................. 264/529 |
| 6,767,197 B2 * | 7/2004 | Boyd et al. .................. 425/143 |
| 6,855,289 B2 * | 2/2005 | Krishnakumar et al. ..... 264/516 |
| 2003/0011109 A1 | 1/2003 | Düringer |
| 2007/0085246 A1 * | 4/2007 | Jaksztat et al. ............... 264/532 |

FOREIGN PATENT DOCUMENTS

| | | |
|---|---|---|
| DE | 1 779 404 | 12/1971 |
| DE | 26 59 655 | 7/1977 |
| DE | 34 08 740 | 9/1984 |
| DE | 37 29 166 | 4/1988 |
| DE | 696 07 636 | 11/2000 |
| DE | 101 45 579 | 7/2003 |

OTHER PUBLICATIONS

Patent Abstract of Japan, JP 56135035 A (Katashi Aoki), Oct. 22, 1981.
Patent Abstracts of Japan, JP 05237923 A (Nissei ASB Mach Co Ltd), Sep. 17, 1993.
Patent Abstracts of Japan, JP 61146521 A (Toyo Seikan Kaisha Ltd), Jul. 4, 1986.

* cited by examiner

METHOD AND DEVICE FOR BLOW MOLDING WORKPIECES BY MEANS OF A BLOWING-STRETCHING MANDREL HAVING SPECIAL AIR DELIVERY PORTS

The invention concerns a method for blow molding containers, in which a preform is stretched inside a blow mold by a stretch rod after thermal conditioning and is reshaped into the container by the action of blowing pressure, and in which pressurized gas is fed into the container through the stretch rod.

The invention also concerns a device for blow molding containers, which has at least one blowing station with a blow mold and at least one stretch rod, and in which the stretch rod is connected to a supply system for supplying pressurized gas.

In container molding by the action of blowing pressure, preforms made of thermoplastic material, for example, preforms made of PET (polyethylene terephthalate), are fed to different processing stations within a blow-molding machine. Typically, a blow-molding machine of this type has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs are gripping tongs for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preform occurs, for one thing, in so-called two-step processes, in which the preforms are first produced by injection molding and temporarily stored and then later conditioned with respect to their temperature and blown into containers. For another, the preforms need to be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

DE-OS 101 45 579 gives a detailed description of a stretching system of a blowing station with an associated stretch rod. The stretch rod is designed here as a solid rod, and the blowing air is fed to the blow mold by a connecting piston that has a larger inside diameter than the outside diameter of the stretch rod. This produces an annular gap between the stretch rod and an inner surface of the connecting piston, through which the pressurized gas can flow.

The use of a hollow stretch rod is described, for example, in DE-OS 28 14 952. A connection for the pressurized gas is created in this case by an end of the tubularly shaped stretch rod that faces away from a stretch rod tip. Supplying pressurized gas through the end of a hollow stretch rod is also described in DE-OS 34 08 740 C2.

The previously known pressurized gas supply systems have not yet been able to meet all of the requirements that are being placed on them by continually increasing production rates. The hoses arranged at the end of the stretch rods for supplying compressed air show a tendency to crack due to the constantly recurring bending stresses produced by the movements of the stretch rod. In the case of pressurized gas supply through a gap surrounding the stretch rod, only a relatively small cross-sectional area is available.

The objective of the present invention is to specify a method of the type described at the beginning, by which the load capacity is improved and at the same time favorable flow characteristics are achieved.

In accordance with the invention, this objective is achieved by introducing the pressurized gas from a pressure chamber laterally into an interior space in the stretch rod.

A further objective of the invention is to design a device of the aforementioned type in such a way that a compact construction, a long service life, and favorable flow characteristics are achieved.

In accordance with the invention, this objective is achieved by virtue of the fact that the stretch rod has at least one port for supplying the pressurized gas, such that the port or ports are located between a stretch rod tip that faces the blow mold and an end of the stretch rod that faces away from the blow mold and open into the interior of the stretch rod.

Moving hose connections are avoided by using a pressure chamber arranged laterally relative to the stretch rod and by feeding the pressurized gas laterally into an interior space of the stretch rod. The pressure chamber can be connected by pipes or hoses to a pressurized gas supply system without movement of the components relative to one another during the production process. Due to the fact that the pressurized gas is supplied through the stretch rod, the pressurized gas can be systematically introduced through discharge ports of the stretch rod into selected regions of the container to be molded.

The method can be used with standard machines for container molding by introducing a gas provided for the blow molding of the containers into the rod interior.

In the production of thermally stable containers, it is proposed especially that a flushing gas be introduced into the rod interior.

In the blow molding of thermally stable containers, it has been found to be especially advantageous for the pressurized gas to be introduced into the rod interior after the container has been molded and before it has been removed from the blow mold.

To provide a low flow resistance, it is proposed that the pressurized gas be introduced into the rod interior through a plurality of ports.

A spatially compact control system with highly accurate reproducibility of the control sequences with respect to time can be achieved by the use of a solenoid valve to control the introduction of the pressurized gas into the rod interior.

Further evening of the flow can be achieved by distributing the ports both along the circumference of the stretch rod and in the direction of a longitudinal axis of the stretch rod.

To help achieve economical production and at the same time ensure high stability, it is proposed that the stretch rod interior extend from the region of the ports to the tip of the stretch rod, and that the region of the stretch rod between the ports and the other end of the stretch rod be solid. Alternatively, however, the stretch rod can also be designed as a tube that is closed at one end.

To achieve a compact design, it is useful for the solenoid valve and the pressure chamber to be connected with each other as a unit.

Short switching times can be achieved by arranging the solenoid valve a short distance from the pressure chamber.

Specific embodiments of the invention are schematically illustrated in the drawings.

Figure 1:
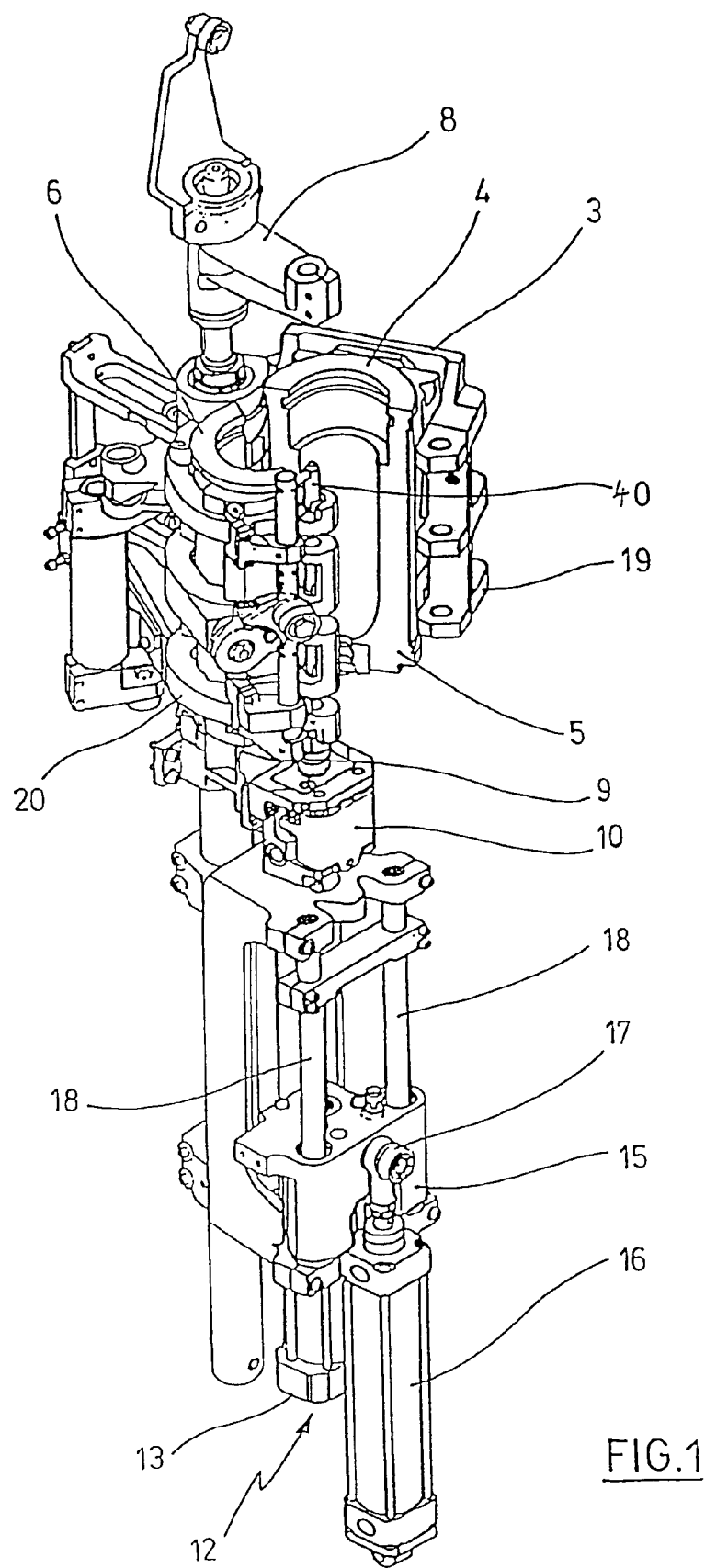
FIG. 1 shows a perspective view of a blowing station for producing containers from preforms.
Figure 2:
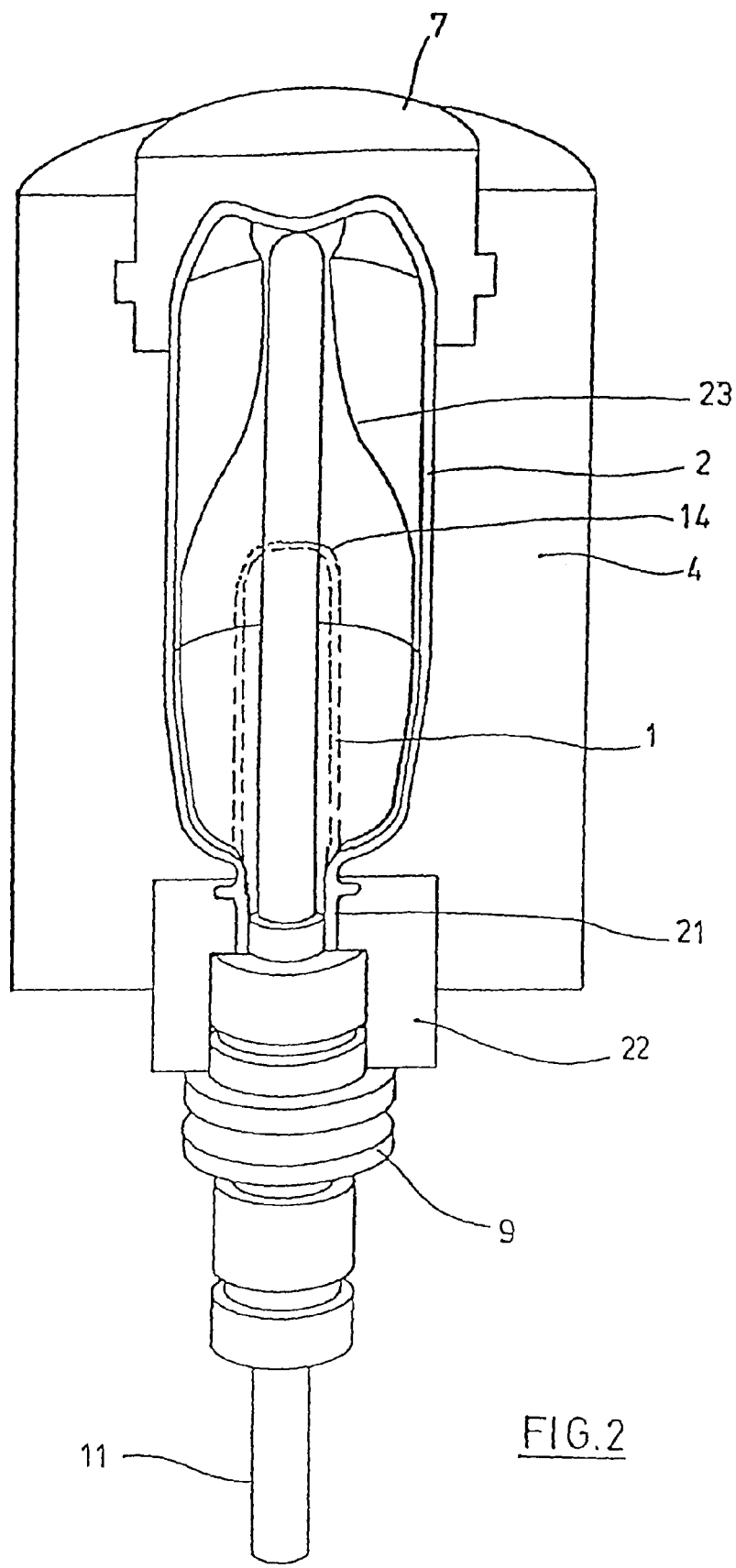
FIG. 2 shows a longitudinal section through a blow mold, in which a preform is stretched and expanded.

FIGS. 1 and 2 show the basic design of a device for reshaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a large number of treatment stations. However, it is also possible to insert the preform 1 directly into the blow mold 4 with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretching rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a curved track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking device 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
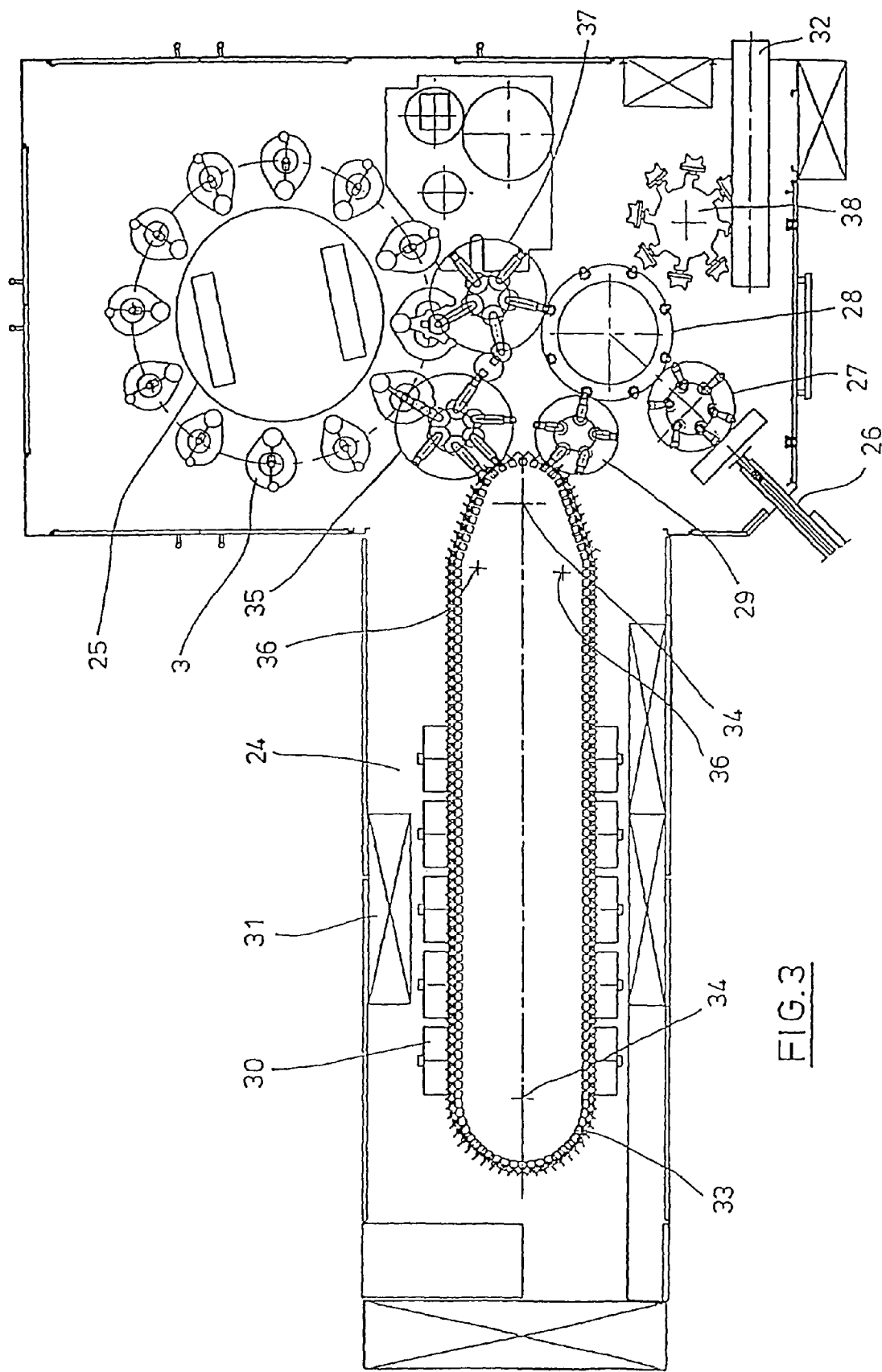
FIG. 3 shows a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be reshaped into a container 2 in such a way that the container 2 has material properties that ensure a long shelf life of foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10-25 bars is typically used, and during the main blowing phase, compressed air with a pressure in the range of 25-40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the expansion of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding expansion of the heating line 24, namely, the smaller guide wheels 36 in the area of the transition to the linear stretches of the heating line 24 and the larger guide wheel 34 in the immediate area of transfer to the transfer wheel 29 and transfer to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
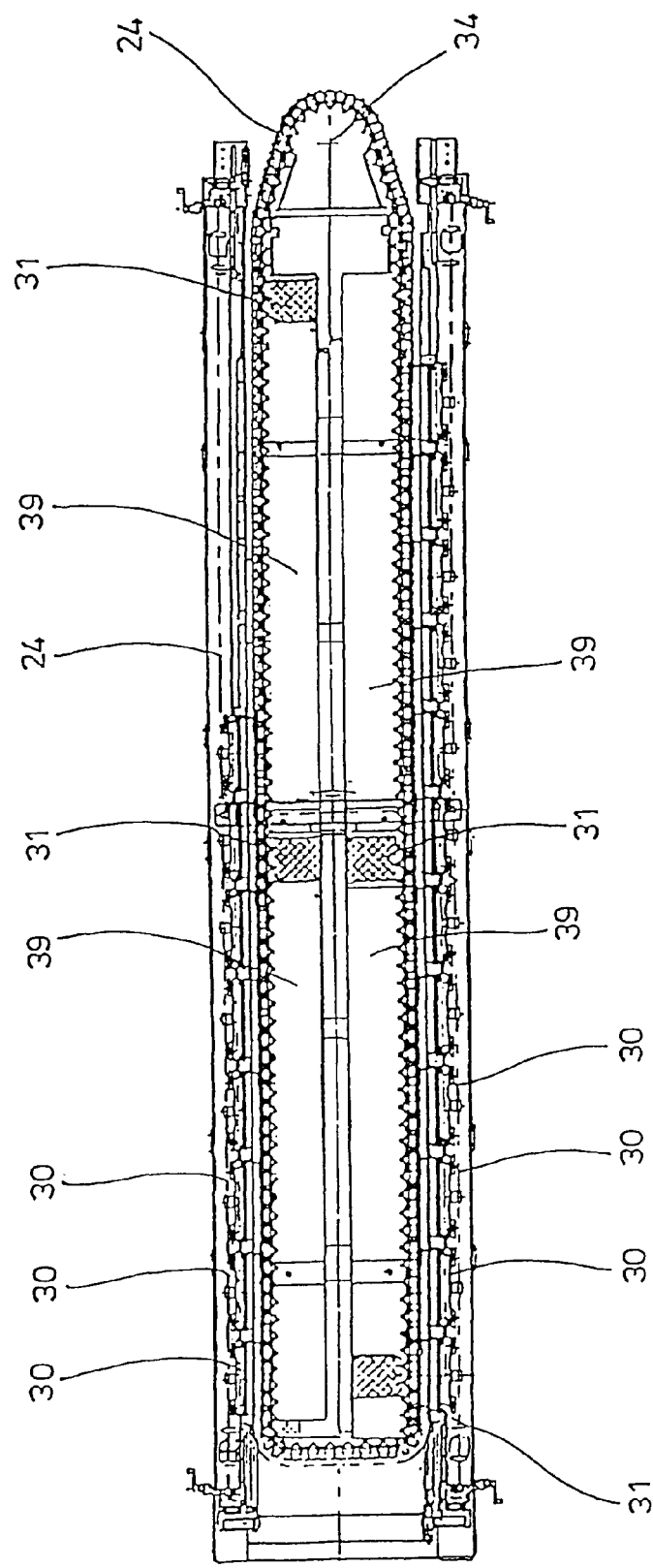
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
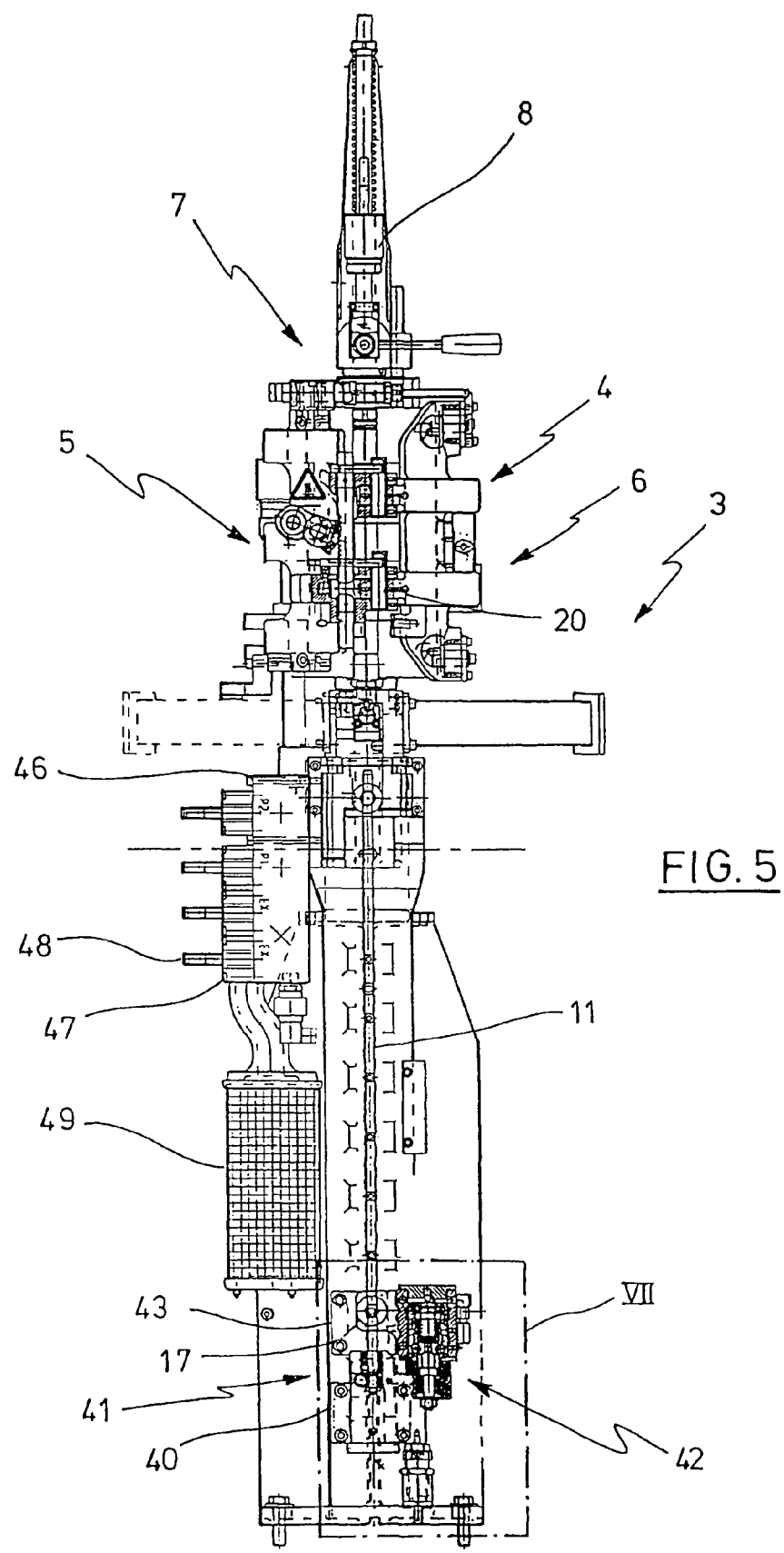
FIG. 5 shows a side view of a blowing station, in which a stretch rod is positioned by a stretch rod carrier.

FIG. 5 shows a view of the blowing station 3 that is modified relative to FIG. 1, with a direction of viewing from the front. In particular, this view shows that the stretch rod 11 is supported by a stretch rod carrier 41, which consists of a carrier base 40 and a roller carrier 43, which is connected with the carrier base 40 by a coupling element 42. The roller carrier 43 supports the guide roller 17, which serves to position the stretching system. The guide roller 17 moves along a curved track (not shown). Complete mechanical control of the stretching process is realized here.

The coupling element 42 illustrated in FIG. 5 can also be used in the embodiment of FIG. 1 to allow complete mechanical decoupling of the cylinders 12 from each other or from a supporting member for the guide roller 17.

FIG. 5 illustrates an engaged state of the coupling element 42, in which the carrier base 40 and the roller carrier 43 results in a rigid mechanical coupling, which causes positioning of the guide roller 17 to be directly and immediately converted to positioning of the stretch rod 11. As a result, precisely predetermined positioning of the stretch rod 11 is present in every state of motion of the blowing wheel 25, and with a large number of blowing stations 3 arranged on the blowing wheel 25, the positioning of the stretch rod 11 is precisely reproduced in each blowing station 3. This precise mechanical presetting of the positioning of the stretch rod 11 contributes to high product quality and high uniformity of the containers 2 that are produced.

FIG. 5 also shows the arrangement of a pneumatic block 46 for supplying blowing pressure to the blowing station 3. The pneumatic block 46 is equipped with high-pressure valves 47, which can be connected by connections 48 to one or more pressure supply sources. After the containers 2 have been blow molded, blowing air to be discharged to the environment is first fed to a muffler 49 via the pneumatic block 46.

Figure 6:
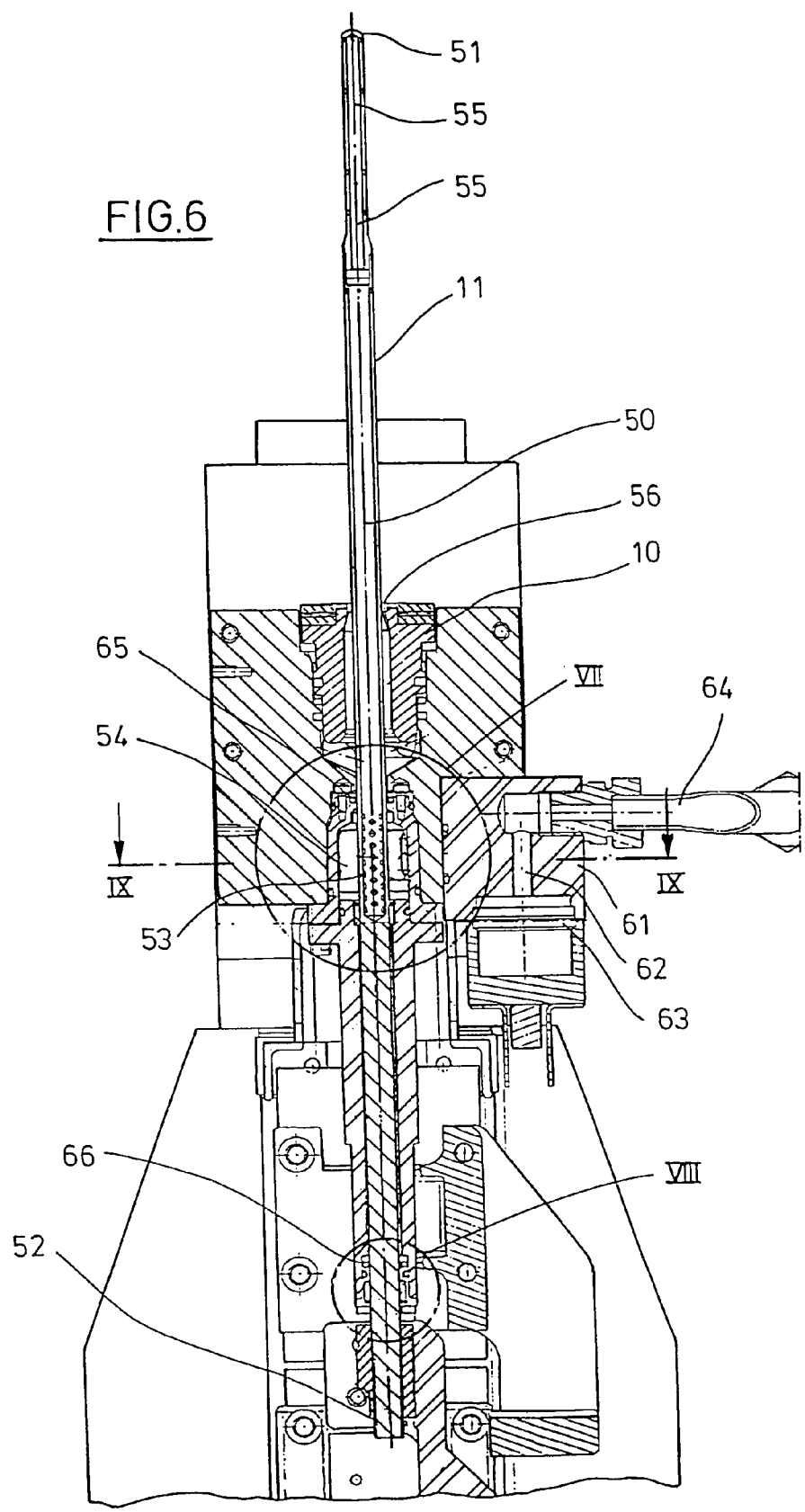
FIG. 6 shows an enlarged and partially cutaway view of an upper region of the stretch rod guide of the stretch rod.

FIG. 6 illustrates that the stretch rod 11 is provided with a rod interior 50, into which ports 53 open, which are positioned in between a stretch rod tip 51 and the opposite end 52 of the stretch rod 11 from the stretch rod tip 51. In the positioning of the stretch rod 10 illustrated in FIG. 6, the ports 53 constitute a connection between the rod interior 50 and a pressure chamber 54.

Discharge ports 55 are positioned in the region of the stretch rod 11 near the stretch rod tip 51. In the specific embodiment illustrated in FIG. 6, an annular gap 56 extends around the stretch rod 11 in the vicinity of the connecting piston 10, so that in this embodiment, pressurized gas can be supplied both through the rod interior 50 and through the annular gap 56.

An admission channel, which connects a control valve 63 with a gas supply line 64, is located in the area of a valve block 61. The gas supply to the pressure chamber 54 is controlled by the control valve 63.

Rod seals 65, 66 seal the stretch rod 11 from the environment. Inside the pressure space bounded by the rod seals 65, 66, sealed guidance of the region of the stretch rod 11 that is provided with the ports 53 is possible.

Figure 7:
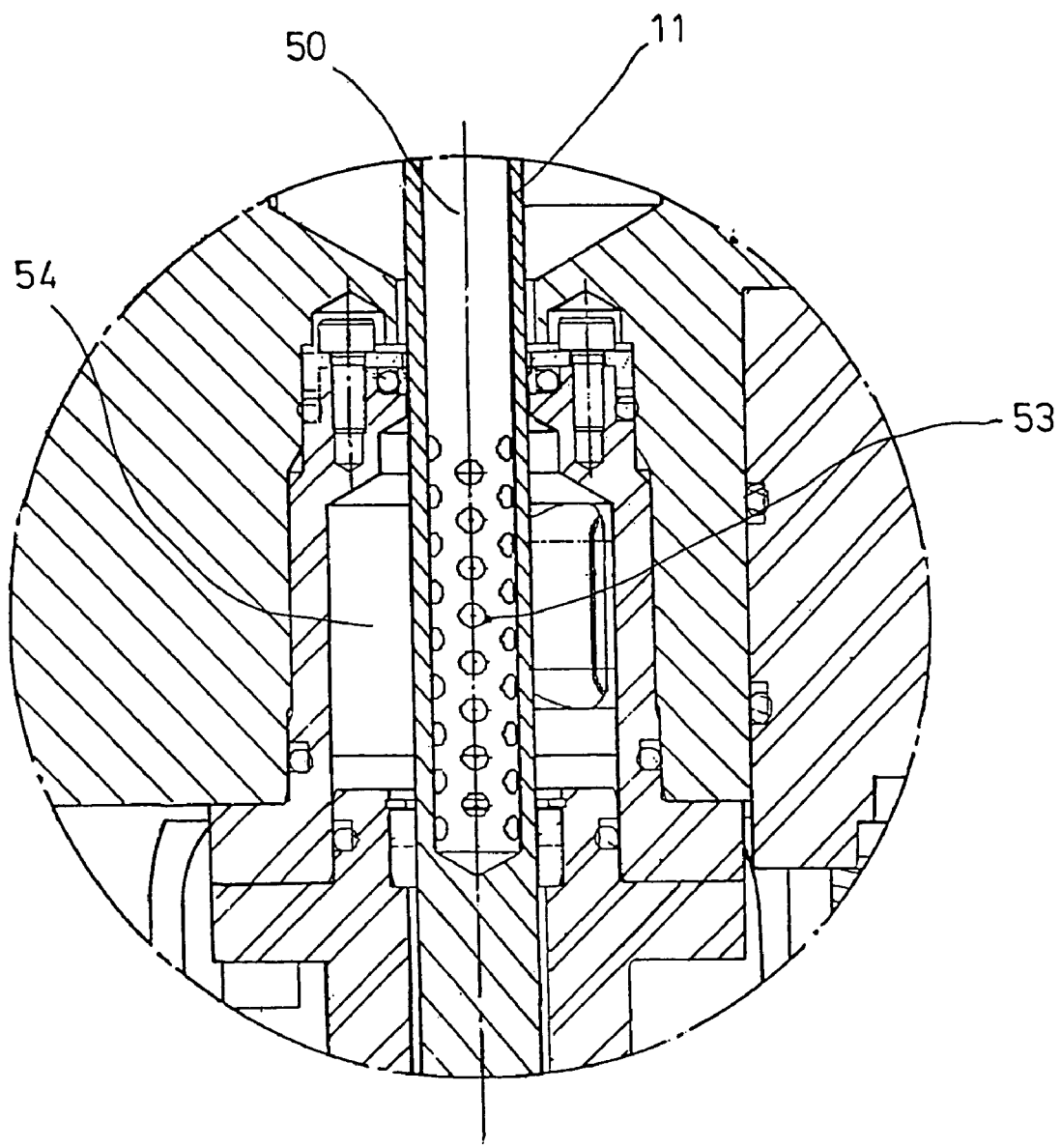
FIG. 7 shows an enlarged view of detail VII in FIG. 6.

FIG. 7 shows the structure of the stretch rod 11 in the region of the ports 53 and the design of the pressure chamber 54 in an enlarged view. In the illustrated embodiment, the ports 53 are arranged in rows in the direction of a longitudinal axis 57 of the stretch rod 11. Several rows of this type are spaced apart along the circumference of the stretch rod 11. In particular, it is proposed that the rows formed in this way in the direction of the longitudinal axis 57 be arranged with relative displacement from one another in such a way that the amount of the displacement is equal to half of the distance separating the ports 53 along the centerline that passes through them. In this way, each port 53 of a row of ports 53 is located at the center of a rectangular reference surface formed by two ports 53 in each of the two rows of ports on either side of the given port 53. This arrangement is conducive to uniform flow.

Figure 8:
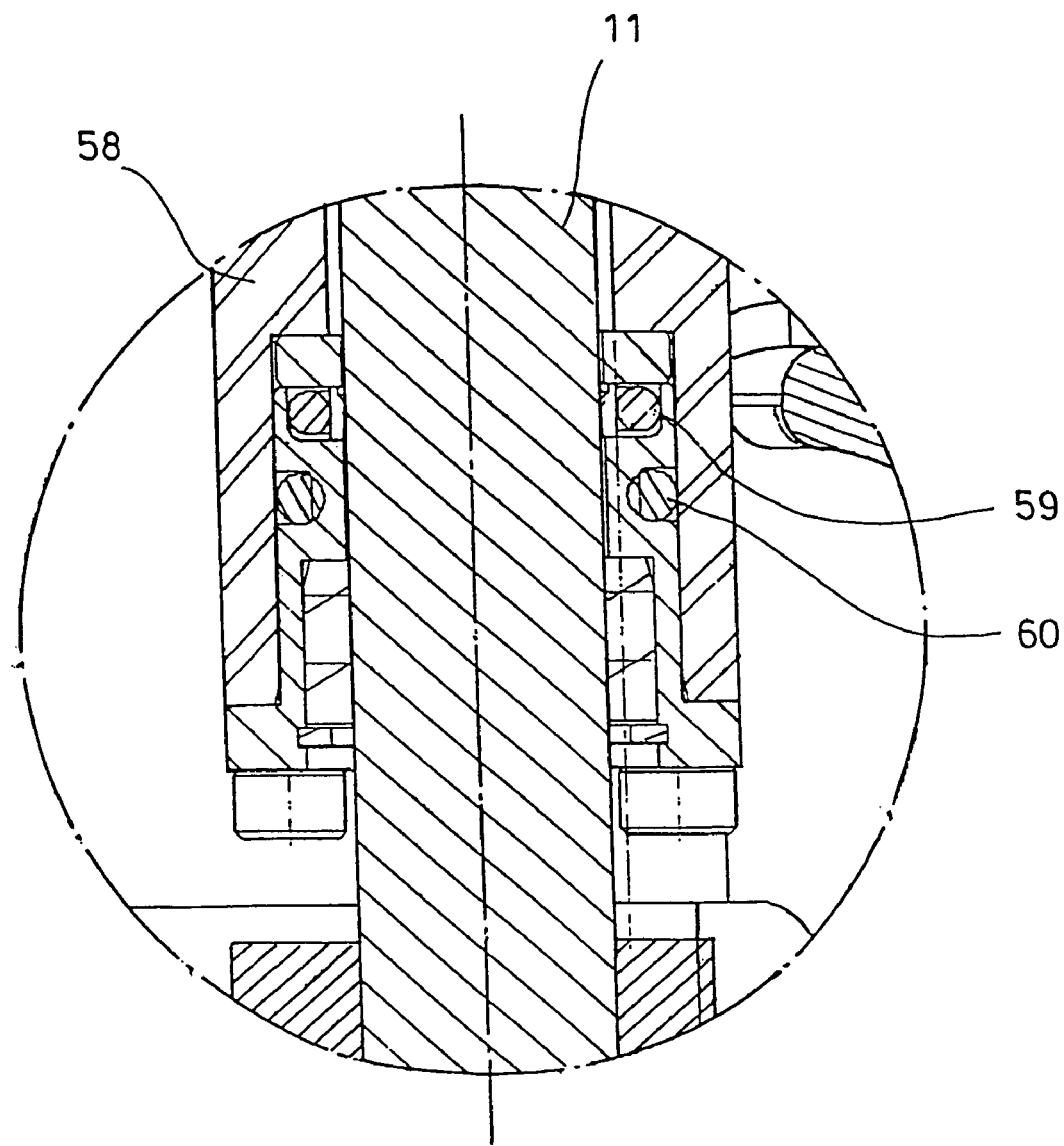
FIG. 8 shows an enlarged view of detail VIII in FIG. 6.

The enlarged view in FIG. 8 shows the sealed guidance of the stretch rod 11 in the region of a support 58. Seals 59, 60 are used for this purpose. The seal 59 can be designed as a rod seal, and the seal 60 can be designed as an O-ring. A rod seal consists of a hard ring, and an O-ring consists of soft metal.

Figure 9:
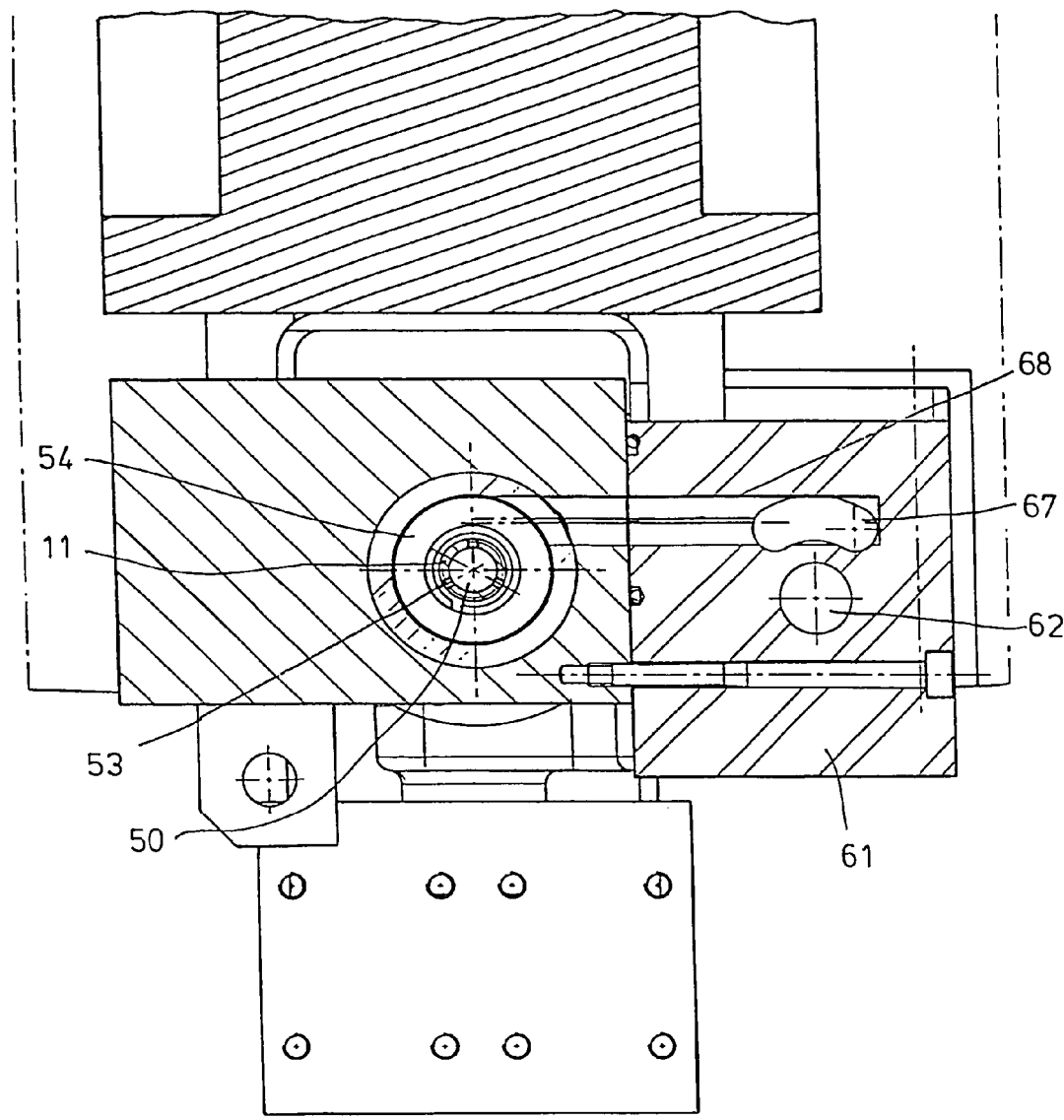
FIG. 9 shows a horizontal section in viewing direction IX-IX in FIG. 6.

FIG. 9 illustrates the design in a horizontal section, showing especially the block-like design and interconnection of the individual components of the device.

Especially the course of a vertical channel 67 that runs from the control valve 63 and the course of a transverse channel 68 that leads to the pressure chamber 54 are evident in FIG. 9. In addition, the drawing shows that three ports 53 arranged equidistantly from one another are positioned in a given plane of the stretch rod 11. This arrangement has the advantage that the ports do not lie opposite each other.

Figure 10:
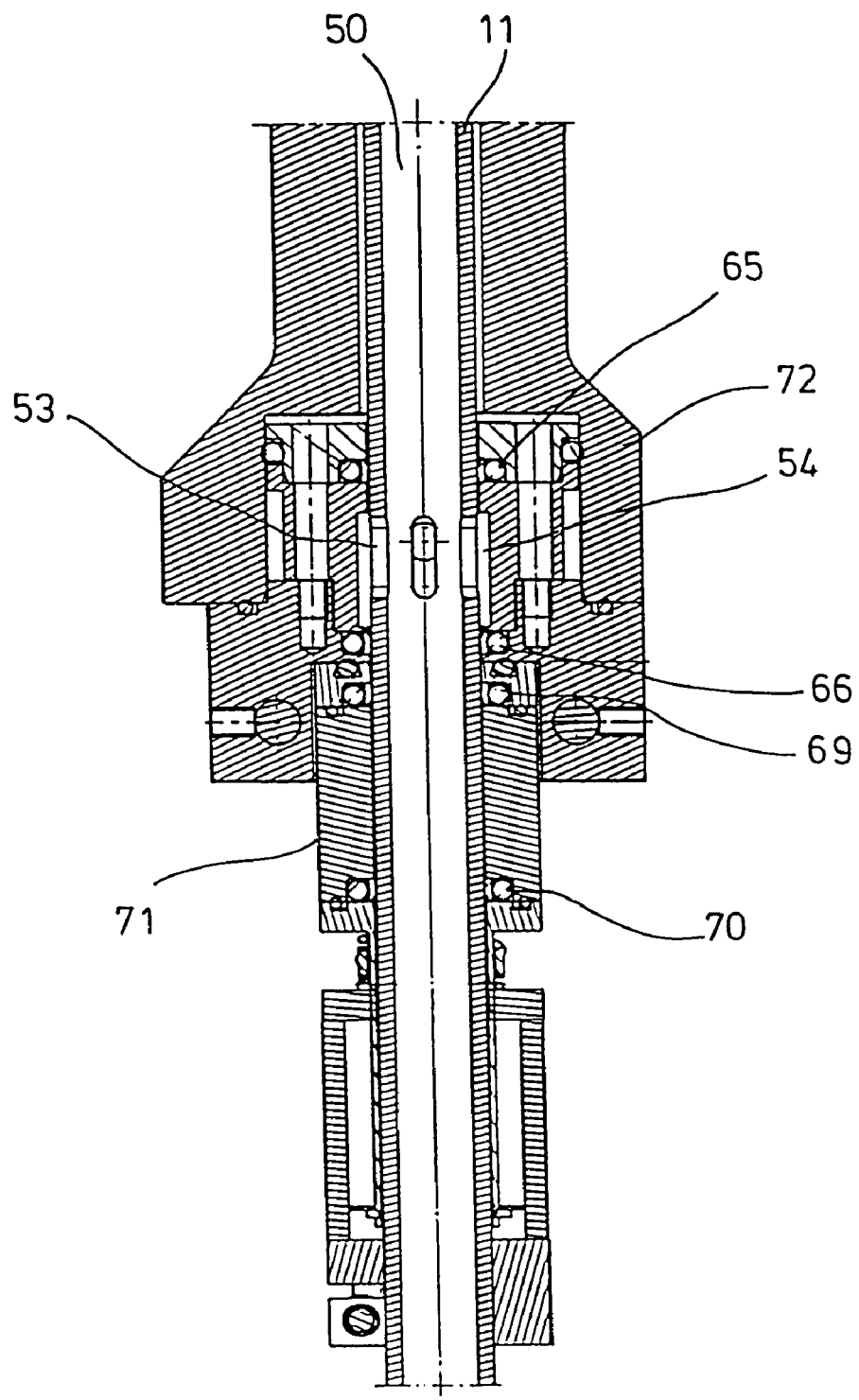
FIG. 10 shows an embodiment with a movable sealing sleeve.

FIG. 10 shows an embodiment that is modified relative to the drawing in FIG. 6. The rod seals 65, 66 are arranged here a relatively small distance from the pressure chamber 54. Additional rod seals 69, 70 are located in the vicinity of a movable sealing sleeve 71, which can be positioned along with the stretch rod 11 at least in certain regions. In the positioning shown in FIG. 10, the movable sealing sleeve 71 has been moved against a chamber housing 72 of the pressure chamber 54.

When the stretch rod 11 is positioned with the ports 53 out of the pressure chamber 54, the region of the stretch rod with the ports 53 is first moved between the rod seals 69, 70. Upon further downward movement of the stretch rod 11, a locking device of the movable sealing sleeve 71 is released, and further downward movement of the stretch rod 11 occurs together with the movable sealing sleeve 71, so that the ports 53 are sealed from the environment. The suitable use of a movable sealing sleeve 71 allows a very compact design of the chamber housing 72.

The invention claimed is:

1. Method for blow molding containers, in which a preform is stretched inside a blow mold by a stretch rod after thermal conditioning and is reshaped into the container by the action of blowing pressure, and in which pressurized gas is fed into the container through the stretch rod for molding the container, wherein the pressurized gas is introduced laterally into an interior space (50) in the stretch rod (11) from a pressure chamber (54), wherein the stretch rod has at least one port, the method including positioning the stretch rod so that the stretch rod extends through the pressure chamber and the at least one port is located within the pressure chamber, positioning the stretch rod in a position in which the at least one port is located outside of the pressure chamber, wherein the blow mold, the pressure chamber and the stretch rod are arranged in region of a blowing station, the stretch rod being movable relative to the blowing station and the pressure chamber being fixed relative to the blowing station.

2. Method in accordance with claim 1, wherein a gas provided for blow molding the containers (2) is introduced into the stretch rod interior (50).

3. Method in accordance with claim 1, wherein a flushing gas is introduced into the rod interior (50).

4. Method in accordance with claim 1, wherein the pressurized gas is introduced into the rod interior (50) after the container (2) has been molded and before it has been removed from the blow mold (4).

5. Method in accordance with claim 1, wherein the pressurized gas is introduced into the rod interior (50) through a plurality of ports (53).

6. Method in accordance with claim 1, wherein a solenoid valve is used to control the introduction of the pressurized gas into the rod interior (50).

7. Device for blow molding containers, which has at least one blowing station with at least one blow mold and at least one stretch rod, wherein the stretch rod is connected to a supply system for supplying pressurized gas, wherein the stretch rod (11) has at least one port (53) for supplying the pressurized gas, such that the port or ports (53) are located between a stretch rod tip (51) that faces the blow mold (4) and an end (52) of the stretch rod (11) that faces away from the blow mold (4) and open into an interior space (50) of the stretch rod (11), wherein the at least one part of the stretch rod is positionable relative to a pressure chamber, between a position in which the at least one port is located within the pressure chamber so that the pressurized gas flows laterally between the interior space of the stretch rod and the pressure chamber, and a position in which the at least one port is located outside of the pressure chamber, wherein the blow mold, the pressure chamber and the stretch rod are arranged in region of a blowing station, the stretch rod being movable relative to the blowing station and the pressure chamber being fixed relative to the blowing station.

8. Device in accordance with claim 7, wherein the stretch rod (11) has a plurality of ports (53).

9. Device in accordance with claim 7, wherein the ports (53) are distributed both along the circumference of the stretch rod (11) and in the direction of a longitudinal axis (57) of the stretch rod (11).

10. Device in accordance with claim 7, wherein the stretch rod interior (50) extends from the region of the ports (53) to the stretch rod tip (51), and that a region of the stretch rod between the ports (53) and the other end (52) of the stretch rod (11) is solid.

11. Device in accordance with claim 7, wherein the pressure chamber (54) is connected to a solenoid valve for supplying compressed air.

12. Device in accordance with claim 11, wherein the solenoid valve and the pressure chamber (54) are connected with each other as a unit.

13. Device in accordance with claim 11, wherein the solenoid valve is arranged a short distance from the pressure chamber (54).

14. Device in accordance with claim 7, wherein a sealing sleeve (71) that can move relative to a chamber housing (72) of the pressure chamber (54) is provided for at least temporary sealing of the ports (63).

15. Device in accordance with claim 14, wherein a portion of the extent of the stretch rod (11) is surrounded by the movable seal (71) in a sleeve-like fashion.

16. Device in accordance with claim 14, wherein the sealing sleeve (71) is provided with at least two rod seals (69, 70) to provide a sealed region.

17. Stretch rod with guiding arrangement for a device for blow molding containers, wherein the stretch rod (11) has at least one port (53) for supplying the pressurized gas for molding the container, such that the port or ports (53) are located between a stretch rod tip (51) and an end (52) of the stretch rod (11) that faces away from the stretch rod tip (51) and open into an interior space (50) of the stretch rod (11), wherein the stretch rod has a plurality of ports, wherein the stretch rod is arranged partially in a pressure chamber such that the port or ports are positionable in the pressure chamber between a position in which the at least one port is located within the pressure chamber and a position in which the at least one port is located outside of the pressure chamber so that the pressurized gas flows laterally between the interior space of the stretch rod and the pressure chamber, and the pressure chamber is connectable to a compressed air supply, wherein the blow mold, the pressure chamber and the stretch rod are arranged in region of a blowing station, the stretch rod being movable relative to the blowing station and the pressure chamber being fixed relative to the blowing station.

\* \* \* \* \*